(No Model.)

E. W. LUCE.
THROTTLE VALVE.

No. 372,077. Patented Oct. 25, 1887.

WITNESSES:
Chas. Nida
C. Sedgwick

INVENTOR:
E. W. Luce
BY Munn &Co.
ATTORNEYS.

UNITED STATES PATENT OFFICE.

EDWIN WEBSTER LUCE, OF BOLIVAR, NEW YORK.

THROTTLE-VALVE.

SPECIFICATION forming part of Letters Patent No. 372,077, dated October 25, 1887.

Application filed February 4, 1887. Serial No. 226,549. (No model.)

*To all whom it may concern:*

Be it known that I, EDWIN WEBSTER LUCE, of Bolivar, in the county of Allegany and the State of New York, have invented a new and Improved Throttle-Valve, of which the following is a full, clear, and exact description.

The object of my invention is to provide a new and improved throttle-valve, which is simple and durable in construction, effective in operation, and permits access to the working parts under any pressure of steam or water.

The invention consists in the construction and arrangement of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
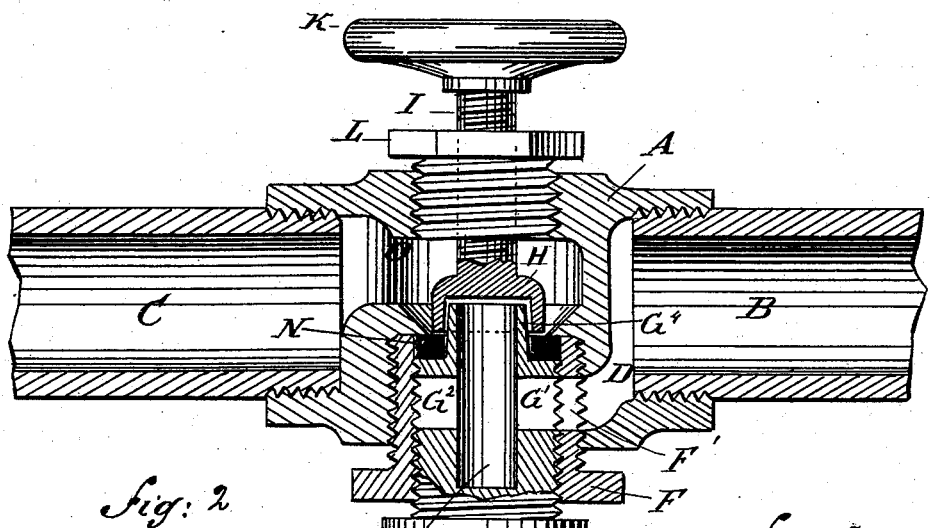
Figure 2:
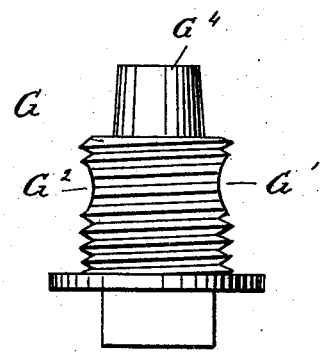
Figure 3:
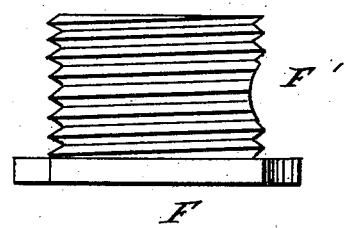
Figure 4:
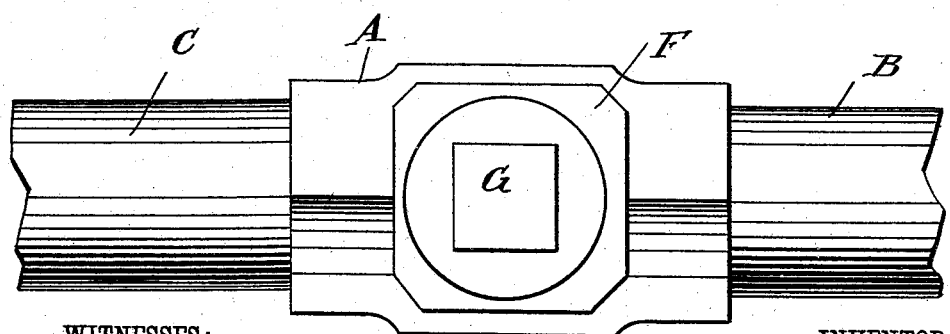

Figure 1 is a central sectional elevation of my improvement. Fig. 2 is a side elevation of the plug supporting the seat. Fig. 3 is a side elevation of the sleeve supporting the plug; and Fig. 4 is a bottom view of my improvement.

Into the valve body A is screwed at opposite sides the inlet and outlet pipes B and C. The inlet-pipe B opens into the chamber or cavity D, formed in the lower part of the valve body A, in which screws the sleeve F, provided with an aperture, F', extending to the opening of the chamber D. Into the sleeve F screws a plug, G, provided with side openings, G' and $G^2$, corresponding in size to the aperture F' in the sleeve F. The apertures G' and $G^2$ lead into the central opening, $G^3$, which connects at its upper end with the inverted bowl-shaped valve H, secured on the screw-rod I, provided with a hand-wheel, K, and screwing in a nut, L, fastened on the upper end of the valve-body A.

The lower end of the inverted bowl-shaped valve H is adapted to seat itself on an elastic gasket N, supported on the upper end of the plug G and held in place at its outer edge by the upper end of the sleeve F. On top of the gasket N opens the channel O, connected with the outlet-pipe C.

It will be seen that when the throttle-valve is closed, as shown in Fig. 1, its valve H is screwed firmly down upon the gasket N, and is thus seated on an elastic seat, whereby all leakage is prevented. The steam or water passes through the pipe B into the chamber D and through the apertures F' and G' or $G^2$ into the central opening, $G^3$, and when the operator now opens the valve H by turning the hand-wheel K the steam or water passes from the central opening, $G^3$, into the channel O, and into the outlet-pipe C. When it is desired to remove the valve, the sleeve F is turned so that its aperture F' is disconnected from the chamber D. The plug G is then unscrewed from the sleeve F, and the nut L is unscrewed from the upper part of the valve-body A, so that the working parts of the valve can be examined and repaired, if necessary.

Full pressure of the steam or water can be obtained in the pipe B during the last-described operation, as the said pipe B is disconnected, by the sleeve F from the outside. Either one of the two openings G' or $G^3$ in the plug G may be connected with the said opening F' in the sleeve F.

Having thus fully described my invention, I claim as new and desire to secure by Letters Patent—

1. In a throttle-valve, the combination, with the valve-body connected with the inlet and outlet pipes, of a sleeve screwing on the said valve-body and having an opening connected with the inlet-pipe, a plug screwing in the said sleeve and having a central opening and side openings adapted to connect with the side opening in the said sleeve, an elastic gasket held on the said plug and upon which opens a channel connected with the outlet-pipe, and a bowl-shaped valve adapted to be seated on the said elastic gasket, substantially as shown and described.

2. In a throttle-valve, the combination, with an inverted bowl-shaped valve, of an elastic gasket forming the seat for the said valve, a plug supporting the said gasket and having a central opening leading to the said valve and side openings connected with the said central opening, and a sleeve having a side opening connected with one of the side openings of the plug, substantially as shown and described.

EDWIN WEBSTER LUCE.

Witnesses:
JAMES O'LEARY,
B. S. DUNN.